United States Patent
Hollmann et al.

(10) Patent No.: US 9,658,360 B2
(45) Date of Patent: May 23, 2017

(54) HIGH RESOLUTION LWD IMAGING

(75) Inventors: Joseph L. Hollmann, Boston, MA (US); Andrew Kirkwood, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 486 days.

(21) Appl. No.: 13/310,389

(22) Filed: Dec. 2, 2011

(65) Prior Publication Data
US 2012/0272724 A1 Nov. 1, 2012

Related U.S. Application Data

(60) Provisional application No. 61/419,309, filed on Dec. 3, 2010.

(51) Int. Cl.
*G01V 3/18* (2006.01)
*G01V 3/38* (2006.01)

(52) U.S. Cl.
CPC ....................................... *G01V 3/38* (2013.01)

(58) Field of Classification Search
CPC ................................ G01V 11/00; E21B 47/22
USPC .............................................. 702/6; 324/346
See application file for complete search history.

(56) References Cited

U.S. PATENT DOCUMENTS

| | | |
|---|---|---|
| 3,305,771 A | 2/1967 | Arps |
| 3,377,549 A | 4/1968 | Newman |
| 3,408,561 A | 10/1968 | Redwine |
| 3,488,574 A | 1/1970 | Tanguy |
| 4,468,623 A | 8/1984 | Gianzero |
| 4,542,648 A | 9/1985 | Vinegar |
| 4,562,556 A | 12/1985 | Ingram |
| 4,642,648 A | 2/1987 | Hulland |
| 4,652,829 A | 3/1987 | Safinya |
| 4,720,681 A | 1/1988 | Sinclair |
| 4,766,442 A | 8/1988 | Issenmann |
| 4,786,874 A | 11/1988 | Grosso |
| 4,845,433 A | 7/1989 | Kleinberg |
| 4,873,488 A | 10/1989 | Barber |
| 4,940,943 A | 7/1990 | Bartel |
| 5,023,450 A | 6/1991 | Gold |
| 5,045,795 A | 9/1991 | Gianzero |
| 5,184,079 A | 2/1993 | Barber |
| 5,200,705 A | 4/1993 | Clark |

(Continued)

FOREIGN PATENT DOCUMENTS

| | | |
|---|---|---|
| EP | 0793000 | 4/2001 |
| GB | 2301438 | 4/1996 |

(Continued)

*Primary Examiner* — Lam Nguyen
(74) *Attorney, Agent, or Firm* — Michael Dae

(57) ABSTRACT

A method for forming a high resolution logging while drilling image includes receiving a logging while drilling data set and selecting a borehole grid. The borehole grid includes a plurality of pixels that define discrete azimuthal positions and depth positions in the borehole. The LWD data set is mapped to the selected borehole grid such that an azimuthal position and a depth position are assigned to each data point in the data set. An interpolation routine is used to fill empty pixels. Disclosed embodiments enable high resolution LWD imaging that may resolve various fine formation features such as fractures, fine bedding layers, breakout, and vugs.

20 Claims, 6 Drawing Sheets

(56) References Cited

U.S. PATENT DOCUMENTS

| | | |
|---|---|---|
| 5,233,522 A | 8/1993 | Sinclair |
| 5,235,285 A | 8/1993 | Clark |
| 5,260,662 A | 11/1993 | Rorden |
| 5,291,137 A | 3/1994 | Freedman |
| 5,331,331 A | 7/1994 | Wu |
| 5,339,036 A | 8/1994 | Clark |
| 5,339,037 A | 8/1994 | Bonner |
| 5,357,797 A | 10/1994 | Maki |
| 5,359,324 A | 10/1994 | Clark |
| 5,381,092 A | 1/1995 | Freedman |
| 5,422,480 A | 6/1995 | Schultz |
| 5,453,693 A | 9/1995 | Sinclair |
| 5,461,562 A | 10/1995 | Tabanou |
| 5,463,319 A | 10/1995 | Chesnutt |
| 5,463,320 A | 10/1995 | Bonner |
| 5,467,832 A | 11/1995 | Orban |
| 5,473,158 A | 12/1995 | Holenka |
| 5,486,695 A | 1/1996 | Schultz |
| 5,491,488 A | 2/1996 | Wu |
| 5,506,769 A | 4/1996 | Fu |
| 5,513,528 A | 5/1996 | Holenka |
| 5,519,318 A | 5/1996 | Koemer |
| 5,519,668 A | 5/1996 | Montaron |
| 5,530,358 A | 6/1996 | Wisler |
| 5,563,512 A | 10/1996 | Mumby |
| 5,591,967 A | 1/1997 | Moake |
| 5,661,402 A | 8/1997 | Chesnutt |
| 5,672,867 A | 9/1997 | Gadeken |
| 5,675,488 A | 10/1997 | McElhinney |
| 5,680,906 A | 10/1997 | Andrieux |
| 5,850,624 A | 12/1998 | Gard |
| 5,867,806 A | 2/1999 | Strickland |
| 5,892,460 A | 4/1999 | Jerabek |
| 5,899,958 A | 5/1999 | Dowell |
| 5,953,683 A | 9/1999 | Hansen |
| 5,966,013 A | 10/1999 | Hagiwara |
| 6,023,168 A | 2/2000 | Minerbo |
| 6,023,658 A | 2/2000 | Jeffryes |
| 6,037,776 A | 3/2000 | McGlone |
| 6,064,210 A | 5/2000 | Sinclair |
| 6,100,696 A | 8/2000 | Sinclair |
| 6,131,694 A | 10/2000 | Robbins |
| 6,166,539 A | 12/2000 | Dahlberg |
| 6,167,348 A | 12/2000 | Cannon |
| 6,173,793 B1 | 1/2001 | Thompson |
| 6,215,120 B1 | 4/2001 | Gadeken |
| 6,307,199 B1 | 10/2001 | Edwards |
| 6,321,456 B1 | 11/2001 | McElhinney |
| 6,326,784 B1 | 12/2001 | Ganesan |
| 6,406,136 B1 | 6/2002 | Fries et al. |
| 6,446,736 B1 | 9/2002 | Kruspe |
| 6,509,738 B1 | 1/2003 | Minerbo |
| 6,510,105 B1 | 1/2003 | Ten Kroode |
| 6,510,106 B2 | 1/2003 | Hudson |
| 6,564,883 B2 | 5/2003 | Fredericks |
| 6,584,837 B2 | 7/2003 | Kurkoski |
| 6,619,395 B2 | 9/2003 | Spross |
| 6,637,524 B2 | 10/2003 | Kruspe |
| 6,693,430 B2 | 2/2004 | Rosthal |
| 6,696,684 B2 | 2/2004 | Radtke |
| 6,704,436 B1 | 3/2004 | Anxionnaz |
| 6,710,601 B2 | 3/2004 | Rosthal |
| 6,714,014 B2 | 3/2004 | Evans |
| 6,715,550 B2 | 4/2004 | Vinegar |
| 6,717,404 B2 | 4/2004 | Prammer |
| 6,724,192 B1 | 4/2004 | McGlone |
| 6,747,569 B2 | 6/2004 | Hill |
| 6,758,277 B2 | 7/2004 | Vinegar |
| 6,768,957 B2 | 7/2004 | Kato |
| 6,774,628 B2 | 8/2004 | Ganesan |
| 6,816,788 B2 | 11/2004 | Van Steenwyk |
| 6,826,842 B2 | 12/2004 | Abe |
| 6,833,706 B2 | 12/2004 | Niina |
| 6,843,318 B2 | 1/2005 | Yarbro |
| 6,891,777 B2 | 5/2005 | Pabon |
| 6,944,548 B2 | 9/2005 | Radtke |
| 6,957,145 B2 | 10/2005 | Spross |
| 7,027,926 B2 | 4/2006 | Haugland |
| 7,103,982 B2 | 9/2006 | Haugland |
| 7,143,521 B2 | 12/2006 | Haugland |
| 7,403,857 B2 | 7/2008 | Haugland |
| 7,558,675 B2 | 7/2009 | Sugiura |
| 7,817,242 B2 * | 10/2010 | Kawakubo et al. ............ 355/53 |
| 2002/0062992 A1 | 5/2002 | Fredericks |
| 2002/0105332 A1 | 8/2002 | Rosthal |
| 2002/0108784 A1 | 8/2002 | Kruspe |
| 2003/0042016 A1 | 3/2003 | Vinegar |
| 2003/0048697 A1 | 3/2003 | Hirsch |
| 2003/0066671 A1 | 4/2003 | Vinegar |
| 2003/0146751 A1 | 8/2003 | Rosthal |
| 2003/0146753 A1 | 8/2003 | Rosthal |
| 2003/0155924 A1 | 8/2003 | Rosthal |
| 2003/0184299 A1 | 10/2003 | Strack |
| 2003/0184303 A1 | 10/2003 | Homan |
| 2003/0227393 A1 | 12/2003 | Vinegar |
| 2004/0079524 A1 | 4/2004 | Bass |
| 2004/0079526 A1 | 4/2004 | Cairns |
| 2004/0089475 A1 | 5/2004 | Kruspe |
| 2004/0144530 A1 | 7/2004 | Bass |
| 2004/0222019 A1 | 11/2004 | Estes |
| 2005/0140373 A1 | 6/2005 | Li |
| 2005/0189947 A1 | 9/2005 | Haugland |
| 2005/0234647 A1 | 10/2005 | Haugland |
| 2006/0179627 A1 | 8/2006 | Sakai |
| 2009/0030616 A1 * | 1/2009 | Sugiura ............................ 702/9 |
| 2012/0133367 A1 * | 5/2012 | Bittar et al. .................. 324/346 |

FOREIGN PATENT DOCUMENTS

| | | |
|---|---|---|
| GB | 2411729 A | 9/2005 |
| GB | 2415049 A | 12/2005 |
| GB | 2416038 A | 1/2006 |

\* cited by examiner

HIGH RESOLUTION LWD IMAGING

RELATED APPLICATIONS

This application claims the benefit of U.S. Provisional Application Ser. No. 61/419,309 entitled Fracture Detection Utilizing Compensated Density, Photoelectric, and Individual Gamma Energy Window Measurements Collected with an Imaging Density Tool, filed Dec. 3, 2010, the disclosure of which is incorporated by reference herein in its entirety.

TECHNICAL FIELD

The disclosure relates generally to methods for making logging while drilling measurements and more particularly to methods for imaging while drilling.

BACKGROUND

Imaging while drilling "IWD" techniques for creating borehole images indicative of various borehole and formation characteristics are well known in oil drilling applications. For example, natural gamma ray, compensated density, photoelectric effect "PE", inductive and galvanic resistivity, and caliper imaging techniques are well known. Such borehole imaging techniques are commonly utilized to provide a visual indication of the direction in which bed boundaries are crossed as well as to quantitatively estimate formation dip and strike angles. Borehole imaging techniques are also commonly utilized in geosteering operations.

Borehole images are commonly formed using data reduction techniques. For example, LWD images may be formed via binning or sectoring methodologies that group the data into a relatively small number of circumferential sectors about the periphery of the tool (e.g., 4, 8, and 16 sectors are commonly utilized). Such data averaging tends to advantageously reduce statistical variations in the raw data and reduces image size thereby sometimes enabling compressed images to be transmitted to the surface in real time while drilling (e.g., via conventional mud column telemetry techniques). However, data averaging also irretrievably destroys the high spatial frequency content of the image (e.g., the content pertaining to the fine geological structure of the formation). Consequently, image interpretation is often limited to an analysis of large-scale structural features.

Microresistivity imaging techniques (also referred to as galvanic resistivity) are sometimes used to obtain high resolution LWD images, for example, for detecting fractures and other fine features in the formation. However the use of non-conductive drilling fluid, or even the presence of a thin non-conductive film on the surface of the formation, can severely impede the flow of electrical current through the fluid into the formation and thereby significantly degrade image quality. As a result, acquisition of high resolution microresistivity LWD images is not always possible. But there remains a need for improved LWD imaging techniques for obtaining high-resolution images, particularly in non-conductive drilling fluid.

SUMMARY

Methods for forming a high resolution image from logging while drilling data are disclosed. One or more embodiments include receiving a logging while drilling data set (e.g., from the memory of an LWD tool) and selecting a borehole grid. The borehole grid includes a plurality of pixels that define discrete azimuthal positions and depth positions in the borehole. The LWD data set is mapped to the selected borehole grid such that an azimuthal position and a depth position are assigned to each data point in the data set. An interpolation routine is used to fill empty pixels. In one embodiment, the interpolation routine utilizes a Gaussian smoothing operation that includes computing a weighted average value of a predetermined number of nearest neighbor pixel values at each pixel location.

The disclosed embodiments may provide various technical advantages. For example, one or more of the disclosed embodiments may provide high resolution LWD images that may resolve various fine formation features such as fractures, fine bedding layers, breakout, and vugs. Images may be advantageously formed having a pixel size smaller than the source-detector spacing of the LWD tool. Moreover, certain disclosed embodiments make use of an interpolation routine that smoothes the image and filters outliers in the raw measurements.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
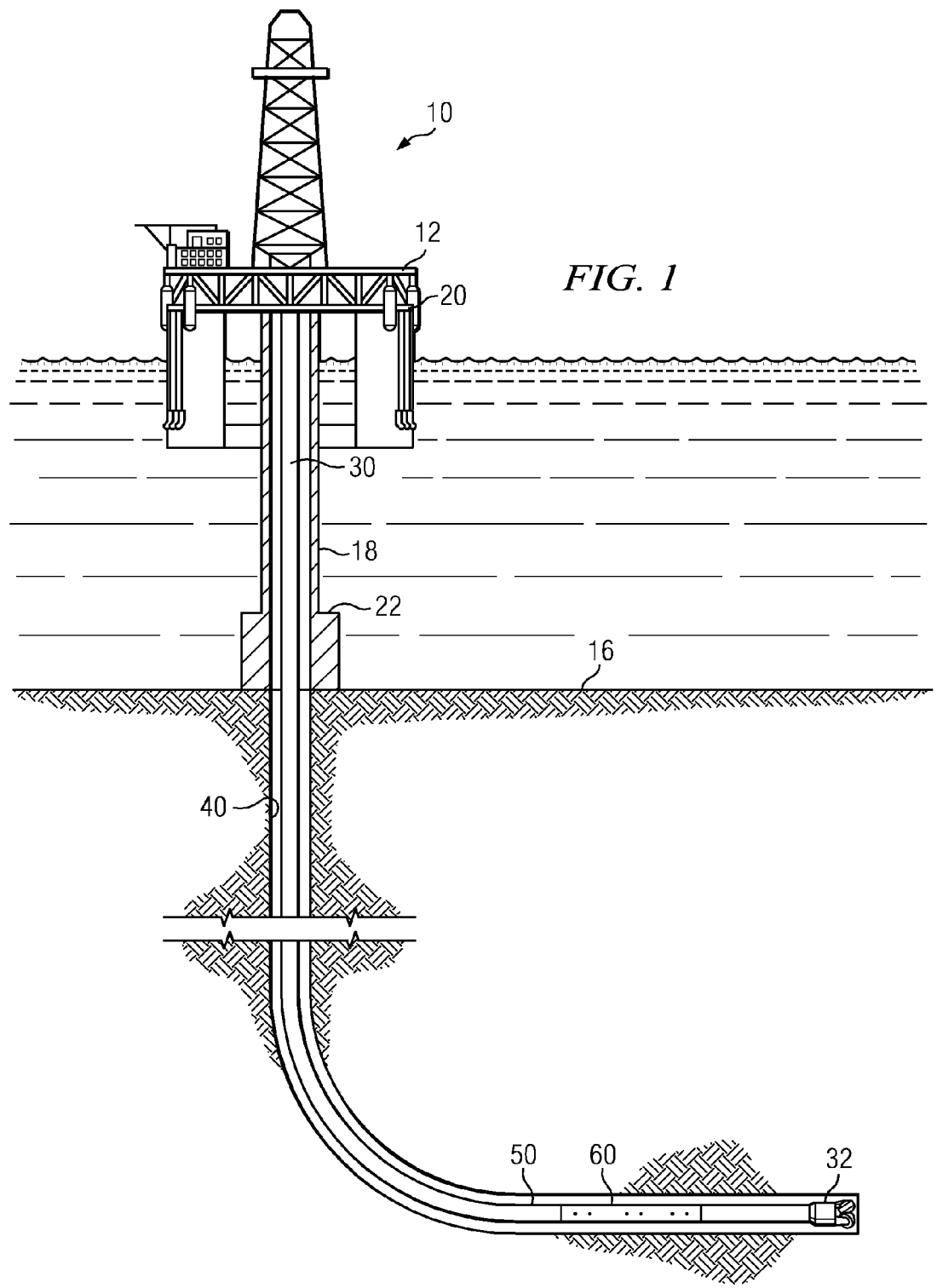
FIG. 1 depicts one example of a conventional drilling rig on which disclosed methods may be utilized.

FIG. 1 depicts drilling rig 10 suitable for using various methods disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 and an imaging while drilling tool 60 (such as the iFinder® imaging density neutron standoff caliper (iDNSC) tool available from PathFinder®, A Schlumberger Company, Katy, Tex., USA). Drill string 30 may further include a downhole drilling motor, a steering tool such as a rotary steerable tool, a downhole telemetry system, and one or more MWD or LWD tools including various sensors for sensing downhole characteristics of the borehole and the surrounding formation. The invention is not limited in these regards.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore. Moreover, while FIG. 1 depicts a logging while drilling operation, it will be understood that one or more of the disclosed embodiments may also be utilized in wireline logging operations (i.e., in wireline imaging operations).

Figure 2:
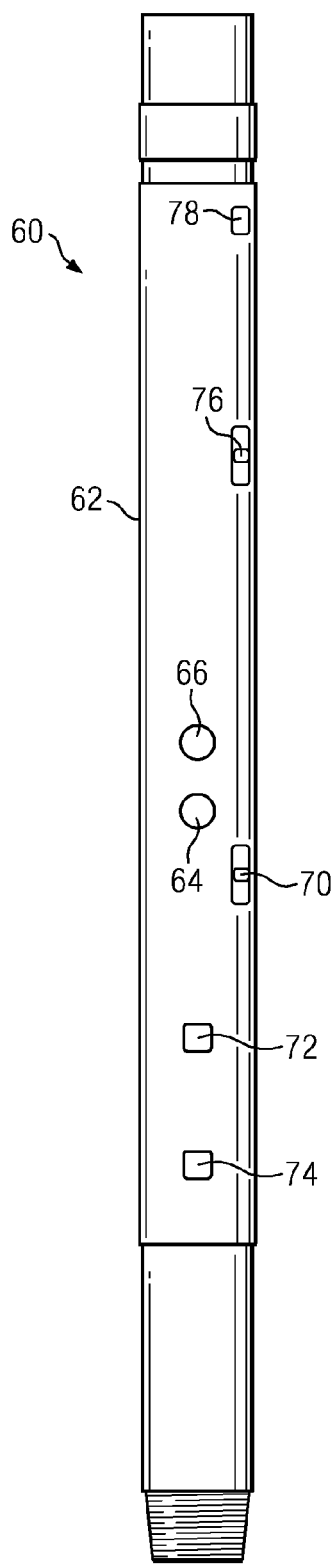
FIG. 2 depicts one example of an imaging while drilling tool that may be utilized to obtain high resolution LWD images.

Disclosed embodiments may be utilized, for example, to obtain density and its related energy windows, PE, natural gamma ray, backscattered gamma ray, sonic, resistivity, and ultrasonic caliper images. FIG. 2 depicts one example of an LWD tool 60 suitable for obtaining raw LWD data that may be used to form such images. The depicted tool embodiment 60 includes an LWD tool body 62 having upper and lower threaded ends for connecting with a drill string. The LWD tool 60 further includes a plurality of sensors for measuring various properties of the borehole and the subterranean formation. A density imaging module includes a gamma ray source 70, for example, including a $^{137}$Cs source. First and second gamma ray detectors 72 and 74 are axially spaced apart from the gamma ray source 70 and from one another. The gamma ray detectors may include conventional scintillation detectors, for example. A neutron module includes a neutron source 76, for example, including a chemical source such as Americium-241/Beryllium (AmBe) or Californium-252 or an electrical source such as a d-T or d-D generator. The neutron module further includes one or more conventional neutron detectors 78, for example, including a conventional $^3$He proportional counter. A standoff module includes first and second axially spaced apart ultrasonic standoff sensors 64 and 66. Substantially any suitable standoff sensors may be utilized. It will be understood that the disclosed method embodiments are not limited to any particular LWD tool configuration or to any particular sensor configuration.

Figure 3:
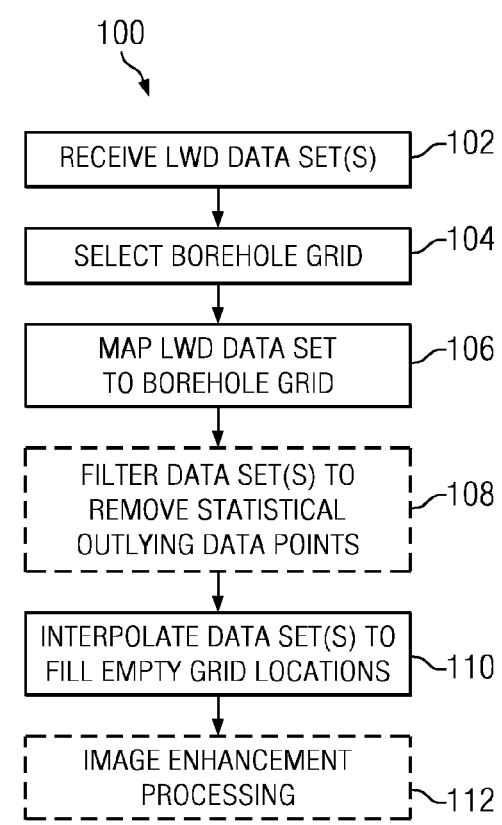
FIG. 3 depicts a flow chart of one disclosed method embodiment.

FIG. 3 depicts a flow chart of one example of a method 100 for obtaining high resolution LWD images. An LWD data set (or sets) including a large number of data points is received at 102. A borehole grid is selected at 104 and the received data set is mapped to the selected borehole grid at 106 (e.g., to selected depth and azimuthal coordinates). The data set may optionally also be processed at 108 to remove statistically outlying data points. The mapped data is processed using an interpolation routine at 110, for example, to fill grid locations (pixels) to which no data has been mapped. Image enhancement techniques, such as histogram equalization, may optionally be applied prior to outputting or viewing the image at 112.

Borehole imaging data may be acquired downhole using substantially any suitable LWD imaging techniques (e.g., density, gamma ray, PE, standoff, resistivity, and the like). For example only, when utilizing LWD tool 60 (FIG. 2), the gamma ray source emits gamma rays radially outward and in a sweeping fashion about the borehole while the tool rotates. Some of the gamma rays emitted from the source interact with the formation and are backscattered towards one of the gamma ray detectors. The sensors and the corresponding electronic hardware may be configured, for example, to count the number of gamma rays received as a function of time during the data acquisition process (e.g.,
while drilling a section of the borehole). The received gamma rays may then be grouped into successive sampling periods such that a data set includes a large number of gamma ray counts acquired in each of the predetermined sampling periods (e.g., 10 millisecond time periods). The data set may therefore include a time stamped set of gamma ray counts, each of the counts being indicative of the number of gamma rays received in the predetermined sampling period. The data set may be saved in downhole memory and received at a surface computer at 102 for subsequent processing. The data set may also be transmitted directly to the surface, for example, using a wired drill pipe data link.

Those of ordinary skill in the art will readily appreciate that in nuclear logging operations multiple Compton scattering and photoelectric absorption events generally lead to a spectrum of gamma ray photons being received by the detectors. The received gamma rays may therefore be further grouped into a number of photon energy levels. For example, in a typical density logging tool, the received gamma rays may be grouped into four to twelve photon energy levels at each sensor. The logging tool may therefore generate a large number of data sets that may be received at 102. These data sets may include a time stamped set of gamma ray counts in each of the photon energy windows at each of the gamma ray detectors. Disclosed embodiments of the invention may generate high resolution LWD images from any one or from any combination of the data sets. For example, a high resolution image may be generated from a combined data set made up of a sum or a ratio of two of the aforementioned data sets. Alternatively, the received gamma rays may be grouped together so as to form a high resolution LWD image from various combinations of all data sets. Moreover, the data sets may also be utilized to compute various formation parameters such as compensated density and photoelectric effect, which may also be imaged using the disclosed methods. And, of course, any single data set may be imaged. Various examples are described in more detail below with respect to FIGS. 5, 6, and 7.

Sensor azimuth data is commonly acquired simultaneously while drilling (and while acquiring the LWD data). The sensor azimuth may be measured using substantially any suitable conventional techniques, for example, including the use of tri-axial accelerometer or tri-axial magnetometer measurements made while drilling. While not shown on FIG. 2, LWD tool 60 may include a tri-axial magnetometer set or first and second cross-axial magnetometers and a processor configured to compute the sensor azimuth (a magnetic toolface) from the magnetometer measurements. Such measurements and calculations are well known in the art and are therefore discussed no further herein.

Sensor azimuth measurements may also be made at a predetermined sampling period (e.g., 10 millisecond time periods). The sensor azimuth data set may therefore include a time stamped set of azimuth measurements, each of the measurements being indicative of the sensor azimuth at a particular point in time. The sensor azimuth measurements may be represented, for example, as 8-bit digital values representative of 256 unique azimuthal positions about the circumference of the borehole. The time stamped set of azimuth values is typically saved in downhole memory and received at a surface computer at 102 along with aforementioned LWD data.

Figure 4:
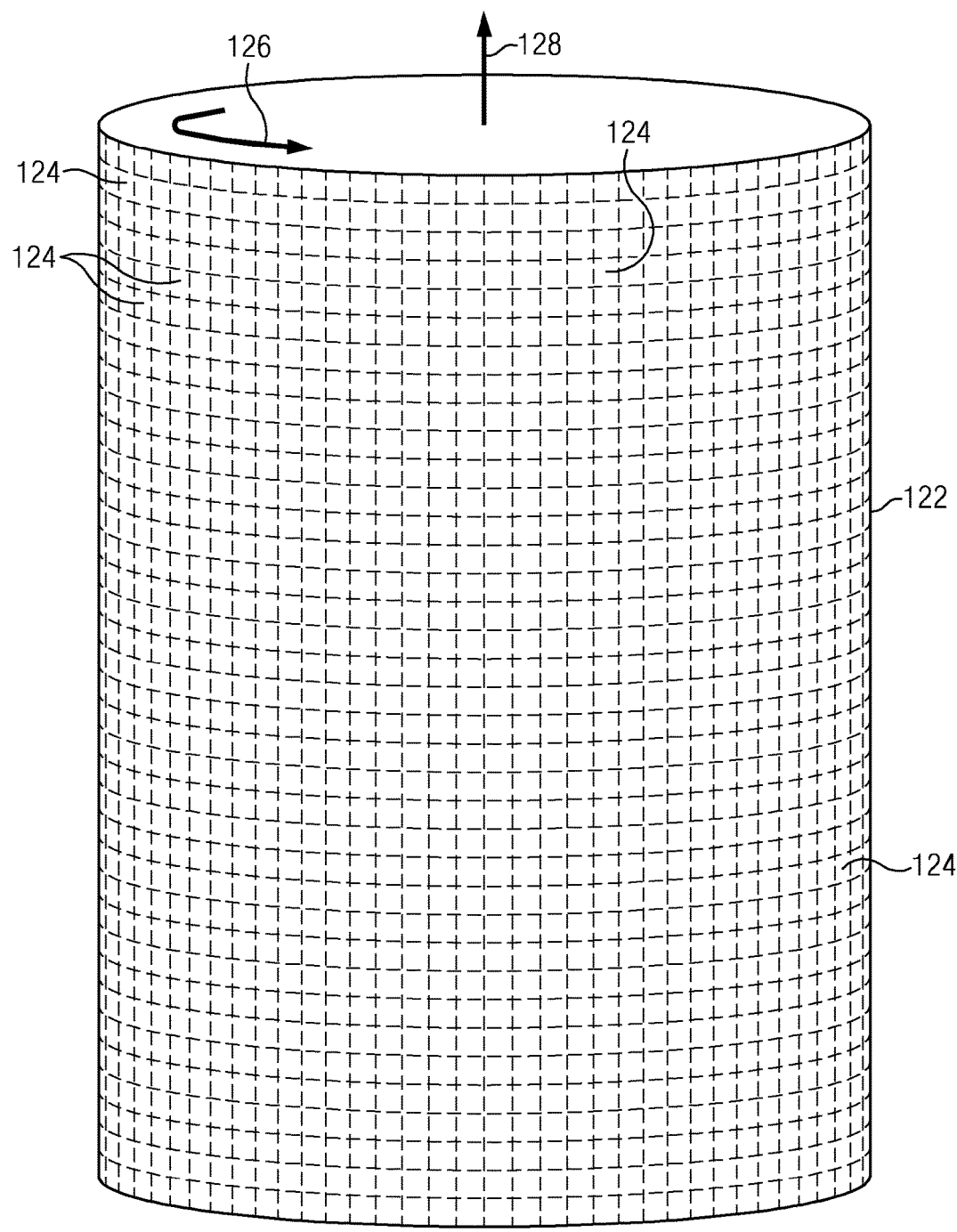
FIG. 4 depicts one example of a borehole grid having pixels defined by circumferential position and depth.

FIG. 4 depicts one example of a borehole grid selected at 104 in method 100. In the depicted example, the borehole is represented as a cylindrical surface 122 and is made up of a number of discrete elements (pixels) 124. Each of the pixels 124 may be defined according to a borehole coordinate system including azimuthal 126 (circumferential) and axial 128 (depth) coordinates. The selected borehole grid may include substantially any number of pixels having substantially any size. For example, in an embodiment in which the data is sparsely populated and/or in which an operator is interested primarily in large scale formation features, a coarse borehole grid may be selected. Such a coarse borehole grid may include, for example, 32 pixels about the circumference of the borehole and 2 pixels per foot of depth. In an embodiment in which the data is densely populated and/or in which an operator is interested in fine scale formation features, a fine borehole grid may be selected. Such a fine borehole grid may include, for example, 512 pixels about the circumference of the borehole and 50 pixels per foot of depth. It will be understood that the disclosed embodiments are not limited to any particular borehole grid characteristics.

In general an image may be thought of as a two-dimensional representation of a parameter value determined at discrete two-dimensional positions. For the purposes of this disclosure, borehole imaging may be thought of as a two-dimensional representation of a measured formation (or borehole) parameter (e.g., gamma ray counts) at discrete azimuths and borehole depths. Such borehole images thus convey the dependence of the measured formation (or borehole) parameter on the borehole azimuth and depth. In forming a high resolution LWD image, the received data set or data sets are mapped to the selected borehole grid at 106. This process involves assigning a borehole azimuth value and a depth value to each data point in the set of gamma ray counts.

The azimuth values may be assigned, for example, by processing the data set including the time stamped set of gamma ray counts in combination with the corresponding time stamped set of azimuth (toolface) measurements described above. The set of azimuth measurements may include an azimuth measurement that directly corresponds to each gamma ray count. For example, gamma ray counts and azimuth measurements may be acquired at identical time intervals (e.g., 10 millisecond intervals). Alternatively, the set of azimuth measurements may include a sufficient number of measurements so that the tool azimuth can be computed for each gamma ray count (e.g., via interpolation).

The depth values may be assigned, for example, based on the time stamp. In such an embodiment, data points having a time value within a selected interval are assigned a common depth (or time) value. For example, the gamma ray counts may be grouped in 10 second intervals, each interval being indicative of a single depth (at a drilling rate of about 60 feet per hour, each interval represents about two inches). In an alternative embodiment, the time stamped set of gamma ray counts may be processed in combination with a depth log (e.g., a time versus depth file) acquired during drilling so as to assign a measured depth value to each gamma ray count. Techniques for assigning depth values to data points in a time stamped set of data points are known in the art.

The data set may be further processed at 108 to remove statistical outliers. For example, the data set may be processed using a robust estimation technique that de-emphasizes statistical outliers. Median filters are one such technique. Conventional median filtering techniques scan through a data set entry by entry and replace each data point with a median value of some predetermined number of neighboring entries. The median filter may be applied in a linear (one dimensional) fashion to the data set (i.e., prior to mapping the data set to the borehole grid in 106) or in a two-dimensional fashion (after mapping the data set). The use of a median filter may be advantageous in certain applications in that it tends to remove noise (e.g., burst noise from the photomultiplier tubes and/or their power supplies which is sometimes referred to as salt and pepper noise) while preserving high contrast edge definition. It will be understood that the disclosed embodiments are not limited to the use of a median filter or even to the use of techniques to remove statistical outliers.

It will be understood that certain pixel locations within the borehole grid commonly remain empty after the mapping in 106 due to certain borehole dynamics conditions, the speed of data acquisition, and the sheer number of pixels in the selected borehole grid. In specific imaging applications, a significant number of pixel locations may remain empty, for example, 5, 10, or even 20 percent of the total pixel locations in the grid may not have an assigned logging while drilling data point. These pixel locations may be assigned a value via interpolation at 110. For example, the mapped data may be interpolated by computing an average or weighted average of a predetermined number of nearest neighbor pixel values. The averaging routine may be a one-dimensional (linear) or two-dimensional routine. In one embodiment a Gaussian distribution weighting function is used in which the midpoint of the Gaussian distribution is centered on a particular pixel and the weighted average value is assigned to the central pixel. The interpolation may also include a straight line average of nearest neighbor pixel values. The intended result of the interpolation process is a fully populated borehole grid of data points. When an average or weighted average, such as a Gaussian distribution, is used, the interpolation routine also tends to smooth the processed image. The degree of smoothing increases with an increasing number of nearest neighbor pixel locations employed. In certain applications it may be advantageous to use a small number of nearest neighbors (e.g. two or three on either side) so as to maintain fine scale features in the image.

Additional image processing (e.g., the use of image enhancement techniques) may also optionally be employed at 112. For example, histogram equalization techniques may be employed so as to optimize the contrast between various features in the image. Histogram equalization techniques tend to enhance contrast (especially in low contrast regions of the image) by expanding the range of the image data so as to fill the available dynamic range. The resulting image is commonly more easily interpreted than the direct display of the interpolated data. Other suitable image enhancement techniques may include a deconvolution technique such as linear deconvolution and homomorphic deconvolution (e.g., in order to deblur the image edges).

Advantages of specific embodiments are now described in further detail by way of the following examples, which are intended to be examples only and should not be construed as in any way limiting the scope of the claims. Logging data was obtained using the disclosed methods in various subterranean formations. The logging sensors were deployed in a PathFinder® iFinder® imaging density neutron standoff caliper tool deployed in a conventional bottom hole assembly (BHA). The BHA configuration was similar to that depicted on FIG. 1. Logging data was acquired while drilling and stored in downhole memory for surface processing. The following images were acquired from a single well while drilling a highly deviated borehole in non-conductive oil based drilling fluid.

Figure 5:
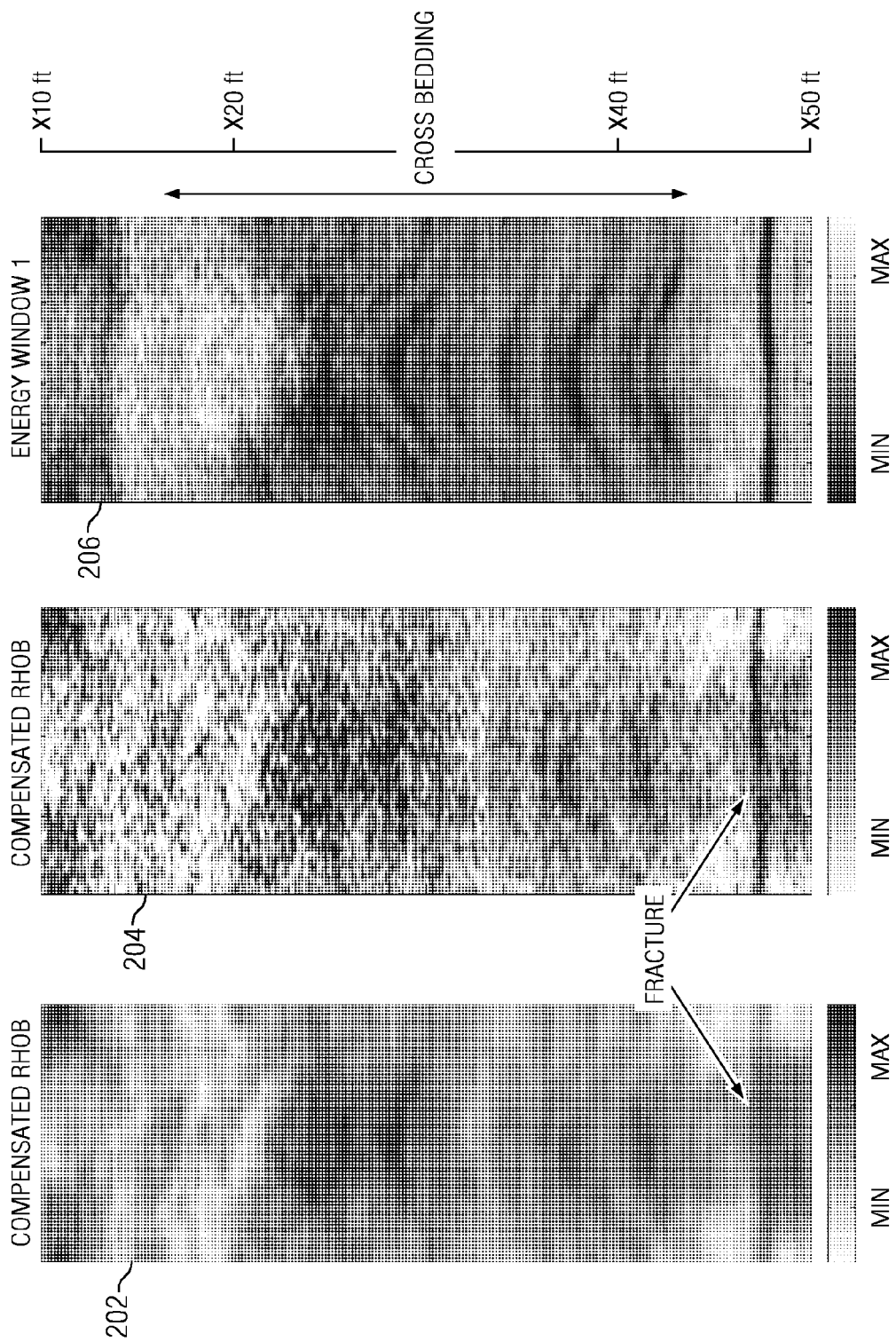
FIG. 5 depicts various LWD images obtained during a subterranean drilling operation.

FIG. 5 depicts a first example including first, second, and third borehole images 202, 204, and 206 of a cross bedded dune structure. Image 202 is a compensated density image acquired using conventional image forming techniques (disclosed in U.S. Pat. No. 7,027,926 to Haugland). Image 204 is a compensated density image formed using a disclosed method described above with respect to FIG. 3. Image 206 is a gamma ray image in which gamma ray counts received in an energy band from about 90 to about 160 keV were imaged using a disclosed method described in FIG. 3. Images 204 and 206 provide superior resolution as compared to the control image 202. For example, a fracture at X48 meters that is barely discernible in the control image 202 is shown with clarity in images 204 and 206. Moreover, fine featured cross bedding layers in the dune structure between X20 and X45 meters are clearly visible in the gamma ray energy band image 206.

Figure 6:
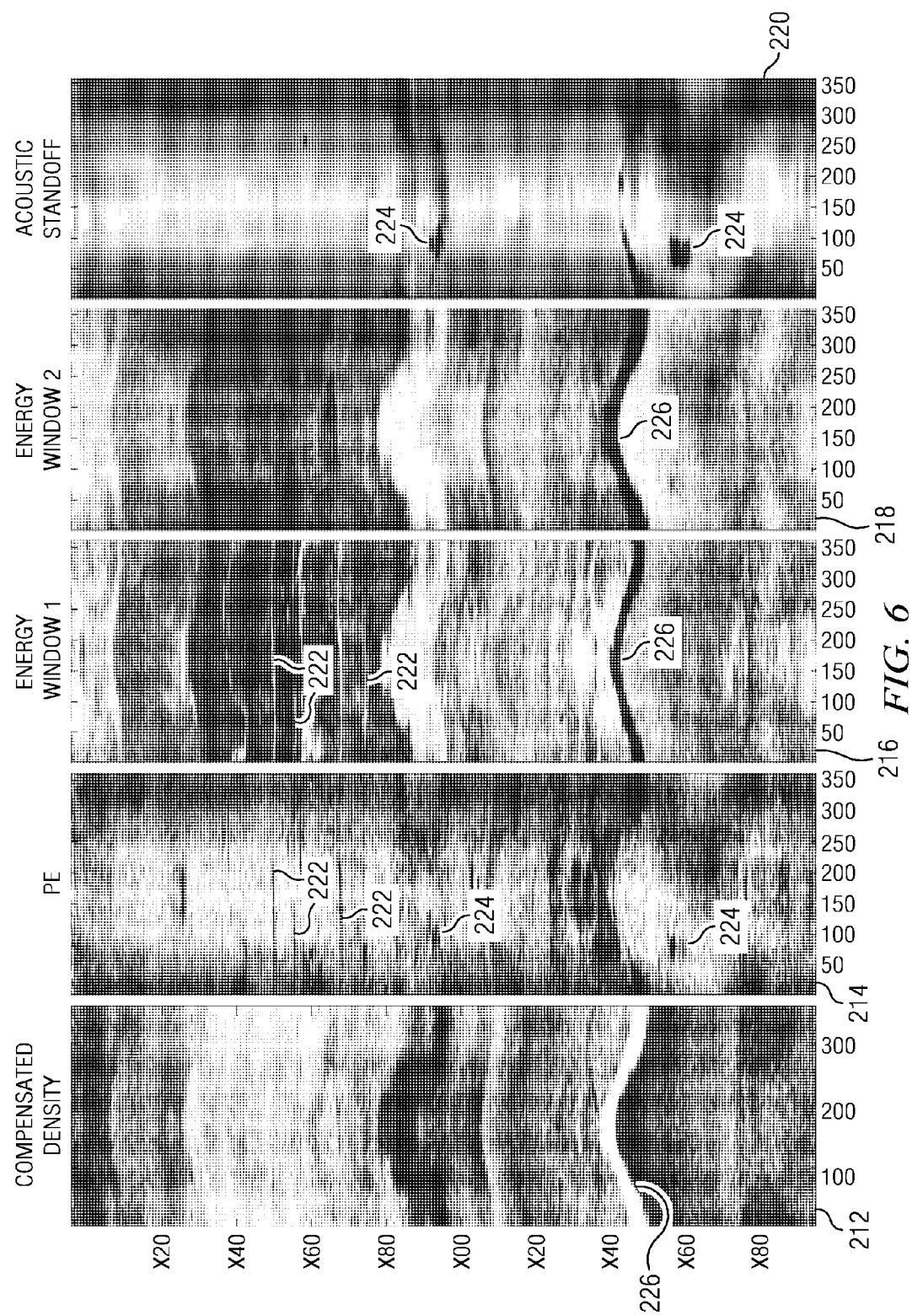
FIG. 6 depicts various LWD images obtained during a subterranean drilling operation.

FIG. 6 depicts a second example including first, second, third, fourth, and fifth images 212, 214, 216, 218, and 220 of a bedded formation. Each of the images was formed using the disclosed method described above with respect to FIG. 3. Image 212 depicts compensated density. Image 214 depicts photoelectric effect. Image 216 depicts gamma ray counts received at the near detector in an energy band from about 90 to about 160 keV. Image 218 depicts gamma ray counts received at the near detector in an energy band from about 230 to about 300 keV. Image 220 depicts ultrasonic standoff. In the depicted example, the photoelectric effect image 214 and the low energy gamma ray image 216 are particularly sensitive to fractures as indicated at 222. The photoelectric effect image 214 and the ultrasonic standoff image 220 are also sensitive to breakout as indicated at 224. Moreover, the density image 212 and gamma ray images 214 and 216 are particularly sensitive to bedding as indicated at 226. PE image 214 is also sensitive to lithology change.

Figure 7:
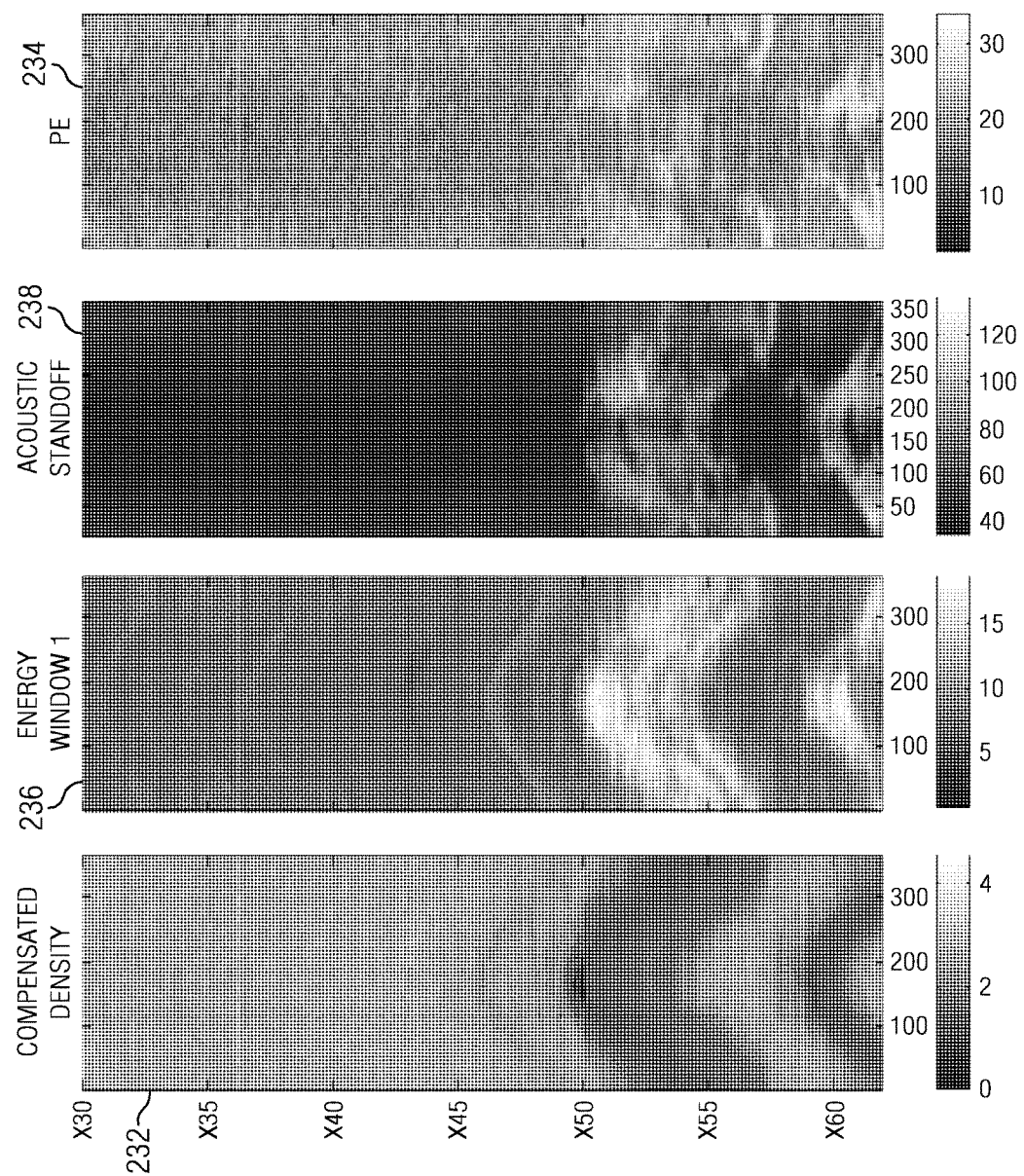
FIG. 7 depicts various LWD images obtained during a subterranean drilling operation.

FIG. 7 depicts a third example including first, second, third, and fourth images 232, 234, 236, and 238 acquired in a coal formation. Each of the images was formed using the disclosed method described above with respect to FIG. 3. Image 232 depicts compensated density. Image 234 depicts photoelectric effect. Image 236 depicts gamma ray counts received in an energy band from about 90 to about 160 keV. Image 238 depicts ultrasonic standoff. Both fine and coarse scale bedding is clearly discernible in the images, particularly the gamma ray image 236.

It will be understood that while not shown in FIGS. 1 and 2, LWD tools suitable for use with the disclosed embodiments generally include at least one electronic controller. Such a controller typically includes signal processing circuitry including a digital processor (a microprocessor), an analog to digital converter, and processor readable memory. A suitable controller typically includes a timer including, for example, an incrementing counter, a decrementing time-out counter, or a real-time clock. The controller may further include multiple data storage devices, various sensors, other controllable components, a power supply, and the like. The controller may also optionally communicate with other instruments in the drill string, such as telemetry systems that communicate with the surface or an EM (electro-magnetic) shorthop that enables the two-way communication across a downhole motor. It will be appreciated that the controller is not necessarily located in the LWD tool, but may be disposed elsewhere in the drill string in electronic communication therewith. Moreover, one skilled in the art will readily recognize that the multiple functions described above may be distributed among a number of electronic devices (controllers).

Although high resolution LWD imaging techniques and certain advantages thereof have been described in detail, it should be understood that various changes, substitutions and alternations can be made herein without departing from the spirit and scope of the disclosure as defined by the appended claims.

What is claimed is:

1. A method for forming an image of logging data, the method comprising:
    (a) receiving a logging while drilling data set that comprises a first number data points obtained by a logging-while-drilling tool over a plurality of depths and at a plurality of azimuthal positions over the plurality of depths, at a processor;
    (b) selecting a borehole grid, the borehole grid including a plurality of pixels defining discrete azimuthal positions and depth positions in a borehole, in the processor, wherein the borehole grid comprises a second number of pixels, wherein the second number of pixels is greater than the first number of data points in the logging while drilling data set;
    (c) mapping each of the data points of the logging while drilling data set received in (a) to at least one pixel the borehole grid selected in (b) such that an azimuthal position and a depth position is assigned to each data point in the data set, while at least one pixel is not mapped to any of the data points and therefore is empty, in the processor; and
    (d) filling the at least one empty pixel determined from (c) with an interpolated data value via interpolation to obtain the image of the logging data, in the processor.

2. The method of claim 1, wherein the logging while drilling data set received in (a) comprises at least one of ultrasonic standoff data, gamma ray data, density data, or photoelectric effect data.

3. The method of claim 1, wherein the logging while drilling data set received in (a) is acquired in a borehole including a non-conductive drilling fluid.

4. The method of claim 1, wherein the logging while drilling data set received in (a) comprises a time stamped set of logging while drilling data acquired at a predetermined time interval.

5. The method of claim 4, wherein the logging while drilling data set further comprises a time stamped set of azimuth measurements.

6. The method of claim 1, wherein the logging while drilling data set is received at a surface location in (a) from memory in a logging while drilling tool.

7. The method of claim 1, wherein the borehole grid includes from about 32 to about 512 azimuthal positions and about 2 to about 50 depth positions per foot of measured depth in the borehole.

8. The method of claim 1, wherein the mapping in (c) comprises processing the data set in combination with a set of azimuth measurements and a set of measured depth measurements such that an azimuthal position and a depth position is assigned to each data point in the data set.

9. The method of claim 1, wherein said interpolation in (d) includes computing an average or weighted average value of a predetermined number of nearest neighbor pixel values at each pixel location.

10. The method of claim 9, wherein a weighted average is computed in which a midpoint of a Gaussian distribution is centered on each of said selected pixel locations.

11. The method of claim 1, further comprising: (e) applying a one-dimensional robust estimation technique to the data set prior to said mapping in (c).

12. The method of claim 1, further comprising: (e) applying a two-dimensional robust estimation technique to the data set after said mapping in (c).

13. The method of claim 1, further comprising: (e) further processing the image using a histogram equalization or a deconvolution technique after said filling in (d).

14. A method for imaging a subterranean formation, the method comprising:
(a) rotating a logging while drilling tool in a borehole, the logging while drilling tool including at least one logging sensor;
(b) causing the logging sensor to acquire a data set that comprises a first number of data points while rotating in (a);
(c) saving the data set to a downhole memory;
(d) receiving the data set at a surface location;
(e) selecting a borehole grid, the borehole grid including a plurality of pixels defining discrete azimuthal positions and depth positions in a borehole, wherein the borehole grid comprises a second number of pixels, wherein the second number of pixels of the borehole grid is greater than the first number of data points in the data set;
(f) mapping the logging while drilling data set received in (d) to the borehole grid selected in (e) such that an azimuthal position and a depth position is assigned to each data point in the data set, but not every pixel is mapped to one of the data points; and
(g) filling empty pixels that were not mapped to one of the data points in step (f) with interpolated data values via interpolation.

15. The method of claim 14, wherein the borehole includes a non-conductive drilling fluid.

16. The method of claim 14, wherein the logging sensor comprises a gamma ray sensor or an ultrasonic standoff sensor and wherein the data set comprises ultrasonic standoff data, gamma ray data, density data, or photoelectric effect data.

17. The method of claim 14, wherein: the logging while drilling data set received in (d) comprises a time stamped set of logging while drilling data acquired at a predetermined time interval; the logging while drilling data set further comprises a time stamped set of azimuth measurements; and the mapping in (e) comprises processing the logging while drilling data in combination with the azimuth measurements and a set of measured depth measurements such that an azimuthal position and a depth position is assigned to each logging while drilling data point.

18. The method of claim 14, wherein said interpolation in (d) includes computing an average or weighted average value of a predetermined number of nearest neighbor pixel values at each pixel location.

19. The method of claim 18, wherein a weighted average is computed in which a midpoint of a Gaussian distribution is centered on each of said selected pixel locations.

20. The method of claim 14, further comprising at least one of the following:
(h) applying robust estimation technique to the data set prior to said mapping in (f); and (i) applying at least one of a histogram equalization and a deconvolution technique to the image after said filling in (d).

* * * * *